United States Patent [19]

Escher et al.

[11] 4,443,485
[45] Apr. 17, 1984

[54] UTILIZATION OF AN AROMATIC ALDEHYDE 4-METHYL-2-HYDROXY-BENZALDEHYDE AS FLAVORING INGREDIENT

[75] Inventors: Sina D. Escher, le Lignon; Paul Dietrich, Troinex, both of Switzerland

[73] Assignee: Firmenich SA, Geneva, Switzerland

[21] Appl. No.: 368,508

[22] Filed: Apr. 15, 1982

[30] Foreign Application Priority Data

May 21, 1981 [CH] Switzerland ..................... 3314/81

[51] Int. Cl.$^3$ ............................................. A23L 1/226
[52] U.S. Cl. ..................................... 426/538; 131/276

[58] Field of Search ........................................ 426/538

[56] References Cited

PUBLICATIONS

Arctander, Perfume and Flavor Chemicals, vols. I–II, 1969, Publ. by the Author: Montclair, N.J., Items No. 268, 2815, 2962.

*Primary Examiner*—Joseph M. Golian
*Attorney, Agent, or Firm*—Pennie & Edmonds

[57] ABSTRACT

4-Methyl-2-hydroxy-benzaldehyde possesses valuable organoleptic properties and consequently can be used as flavoring ingredient in foodstuffs and beverages as well as in tobacco.

2 Claims, No Drawings

UTILIZATION OF AN AROMATIC ALDEHYDE 4-METHYL-2-HYDROXY-BENZALDEHYDE AS FLAVORING INGREDIENT

BRIEF SUMMARY OF THE INVENTION

The instant invention relates to the field of flavors, more particularly it provides a process to enhance, modify or improve the flavor properties of foodstuffs, beverages, smoking tobacco and tobacco products, which process comprises the step of adding thereto a small but flavor effective amount of 4-methyl-2-hydroxy-benzaldehyde.

This invention provides also a flavoring composition which contains as a flavor active ingredient 4-methyl-2-hydroxy-benzaldehyde.

BACKGROUND OF THE INVENTION

4-Methyl-2-hydroxy-benzaldehyde is a known chemical entity [see e.g.: Ber. 11, 773 (1878) and Bull. Soc. Chim. France 35, 129–134 (1924)], sofar however, its organoleptic properties have remained unrecognized.

Though, it represents a simple higher homolog of prior used salicylic aldehyde, the compound of the present invention possesses unexpectedly an original flavor character which is distinct from that shown by this latter compound. In fact, salicylic aldehyde possesses a spicy and irritating odor similar to that shown by compounds such as benzaldehyde, acetophenone or nitrobenzene, accompanied by a marked phenolic note which renders its utilization rather difficult. In contradistinction therefrom, 4-methyl-2-hydroxy-benzaldehyde develops a sweet gustative note of caramel and burnt type reminiscent of some of the aspects of coumarin.

Preferred Embodiments of the Invention

Owing to its organoleptic properties, 4-methyl-2-hydroxy-benzaldehyde can find a wide range of utilizations either in the direct aromization of foodstuffs, beverages and tobacco, or in the manufacture of flavor compositions of various nature.

Its intrinsic characters match well with those of most of the commonly encountered flavor ingredients and it can enter in the manufacture of compositions of caramel, vanilla, cocoa, chocolate, nut, hay, tobacco or cinnamon type, or it can be used as partial substitute for coumarin. These compositions are particularly suitable for the aromatization of foodstuffs in general, especially of bakery and confectionary products, and of beverages, viz. those of milk and cocoa base, of yoghurts and of tobacco of natural and synthetic origin.

The concentrations at which the aldehyde of the invention develops interesting gustative effects can vary in a wide range of values. Preferably, they are of between about 0.1 and 10 ppm (parts per million) by weight based on the total weight of the flavored material. Of course, these values can be much higher than the above given upper limit, especially whenever 4-methyl-2-hydroxy-benzaldehyde is utilized in the manufacture of aroma concentrates. In the aromatization of tobacco and tobacco products, the typical concentration average value is in the order of 50 ppm, it can be however of between about 5 and 200 ppm.

As stated above, 4-methyl-2-hydroxy-benzaldehyde can be added directly to the material to be flavored. Typically however, it is used in solution in common edible solvents such a dipropylene-glycol or triacetine, or over solid supports, for instance gum arabic or dextrine.

4-Methyl-2-hydroxy-benzaldehyde can be prepared by one of the known methods, for example starting from m-cresol according to G. Casiraghi et al., J. Chem. Soc., Perkin I, (1980), 1862-5.

The invention is illustrated in a more detailed manner by the following examples.

EXAMPLE 1

A base flavor composition of vanille-caramel type was prepared by mixing the following ingredients (parts by weight):

| | |
|---|---|
| Maltol | 15 |
| Vanillin | 200 |
| Ethyl-vanillin | 50 |
| Anisic alcohol | 10 |
| Acetoine | 5 |
| Rhum ether | 20 |
| Propylene-glycol | 700 |
| Total | 1000 |

By using two aliquots of 100 g each of the above compositions, two novel compositions were prepared as follows:

| | A "control" | B "test" |
|---|---|---|
| Base composition | 100 | 100 |
| 4-Methyl-2-hydroxy-benzaldehyde 10% in ethanol | — | 20 |
| 95% Ethanol | 900 | 880 |
| | 1000 | 1000 |

Compositions A and B thus prepared were separately diluted in crystal spring water at 0.1% and subjected to an evaluation by a panel of flavor experts. Their comments were as follows:

| | |
|---|---|
| Composition A: | vanilla note |
| Composition B: | vanilla-caramel note with a slightly coumarinic aftertaste. |

EXAMPLE 2

0.5 g of a 1% solution of 4-methyl-2-hydroxy-benzaldehyde in 95% ethanol were sprayed onto 100 g of a mixture of "american blend" tobacco. The aromatized tobacco was used to manufacture "test" cigarettes the smoke of which was organoleptically evaluated by comparison with that obtained by cigarettes containing unflavored tobacco ("control") preliminary treated with 95% ethanol.

A group of experts found that the smoke of the "test" cigarettes possessed a milder and more pleasant character, associated with a coumarinic note.

What we claim is:

1. A method to enhance, modify or improve the sweet gustative note of caramel and burnt type reminiscent of coumarin of foodstuffs and beverages which comprises the step of adding thereto from about 0.1 to 10 parts per million by weight of 4-methyl-2-hydroxy-benzaldehyde based on the total weight of the resulting flavored foodstuffs and beverages.

2. A foodstuff or a beverage which contains as a flavor active ingredient 4-methyl-2-hydroxy-benzaldehyde at a concentration of between about 0.1 to 10 parts per million by weight based on the total weight of the resulting flavored foodstuff or beverage, said ingredient possessing a sweet gustative note or caramel and burnt type reminiscent of coumarin.

* * * * *